Figure 1:
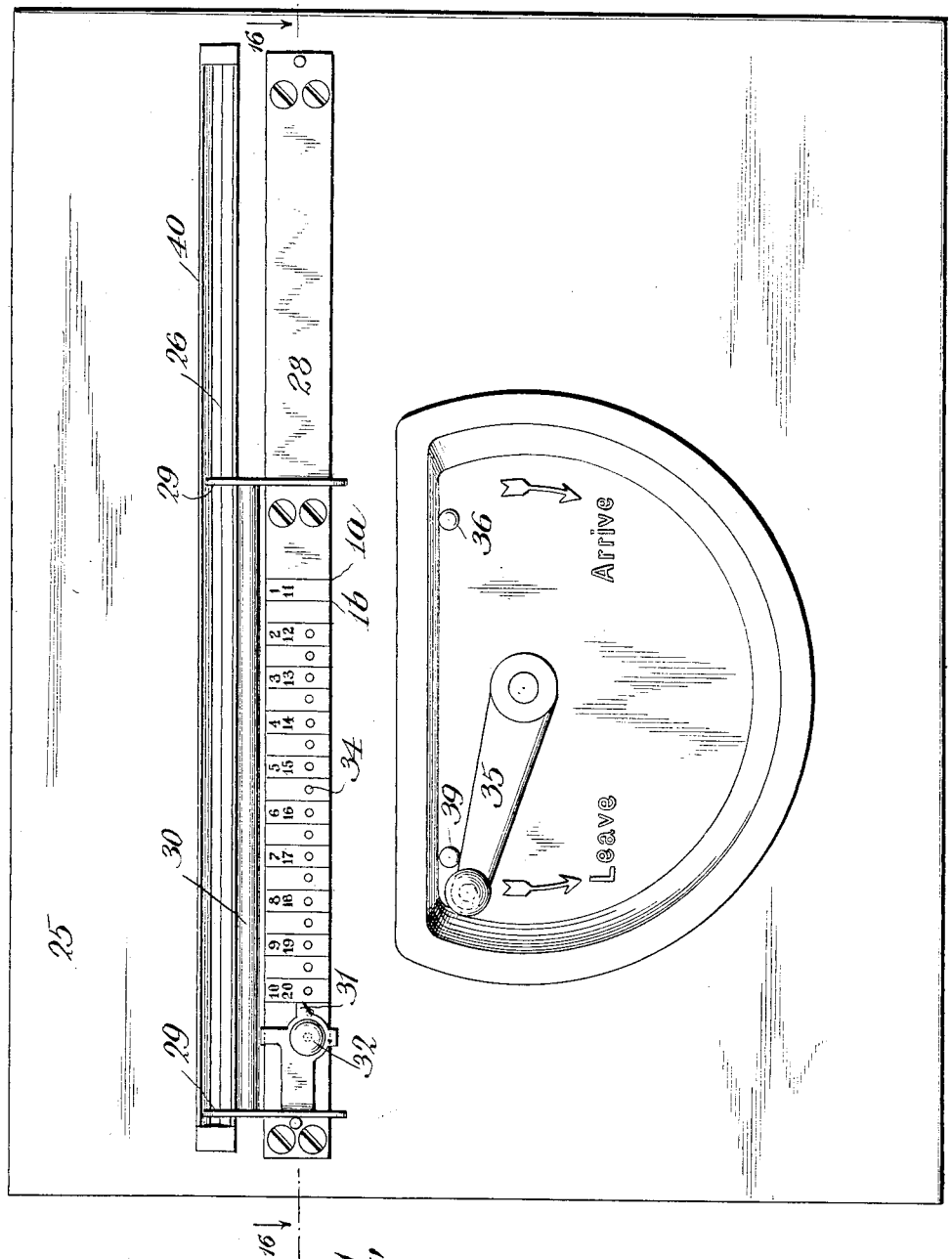

C. E. LARRABEE.
TIME RECORDER FOR VEHICLES.
APPLICATION FILED JUNE 21, 1911.

1,133,045.

Patented Mar. 23, 1915.
12 SHEETS—SHEET 1.

WITNESSES:

INVENTOR
Clinton E. Larrabee
BY
his ATTORNEYS

C. E. LARRABEE.
TIME RECORDER FOR VEHICLES.
APPLICATION FILED JUNE 21, 1911.

1,133,045.

Patented Mar. 23, 1915.
12 SHEETS—SHEET 2.

WITNESSES:

INVENTOR
Clinton E. Larrabee
BY
his ATTORNEYS

C. E. LARRABEE.
TIME RECORDER FOR VEHICLES.
APPLICATION FILED JUNE 21, 1911.

1,133,045.

Patented Mar. 23, 1915.
12 SHEETS—SHEET 3.

WITNESSES:

INVENTOR
Clinton E. Larrabee
BY
his ATTORNEYS

C. E. LARRABEE.
TIME RECORDER FOR VEHICLES.
APPLICATION FILED JUNE 21, 1911.

1,133,045.

Patented Mar. 23, 1915.
12 SHEETS—SHEET 4.

WITNESSES:

INVENTOR
Clinton E. Larrabee
BY
Kerr, Page, Cooper & Hayward
his ATTORNEYS

C. E. LARRABEE.
TIME RECORDER FOR VEHICLES.
APPLICATION FILED JUNE 21, 1911.

1,133,045.

Patented Mar. 23, 1915.
12 SHEETS—SHEET 5.

WITNESSES:

INVENTOR
Clinton E. Larrabee
BY
ATTORNEYS

C. E. LARRABEE.
TIME RECORDER FOR VEHICLES.
APPLICATION FILED JUNE 21, 1911.
1,133,045.
Patented Mar. 23, 1915.
12 SHEETS—SHEET 6.
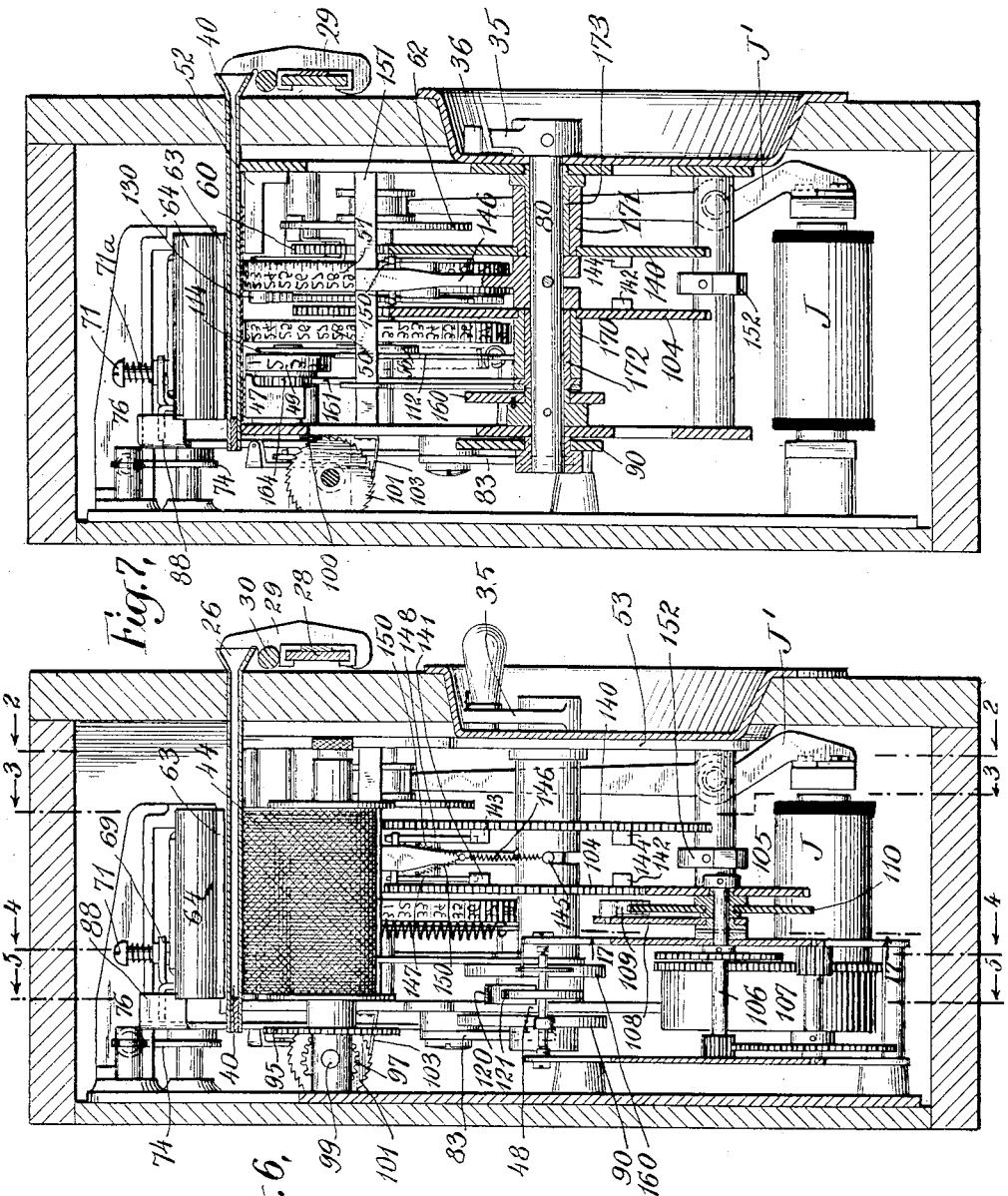
WITNESSES:
WP Johnson
SL Dunham
INVENTOR
Clinton E. Larrabee
BY
Kerr, Page, Cooper & Hayward
his ATTORNEYS C. E. LARRABEE.
TIME RECORDER FOR VEHICLES.
APPLICATION FILED JUNE 21, 1911.
1,133,045.
Patented Mar. 23, 1915.
12 SHEETS—SHEET 7.
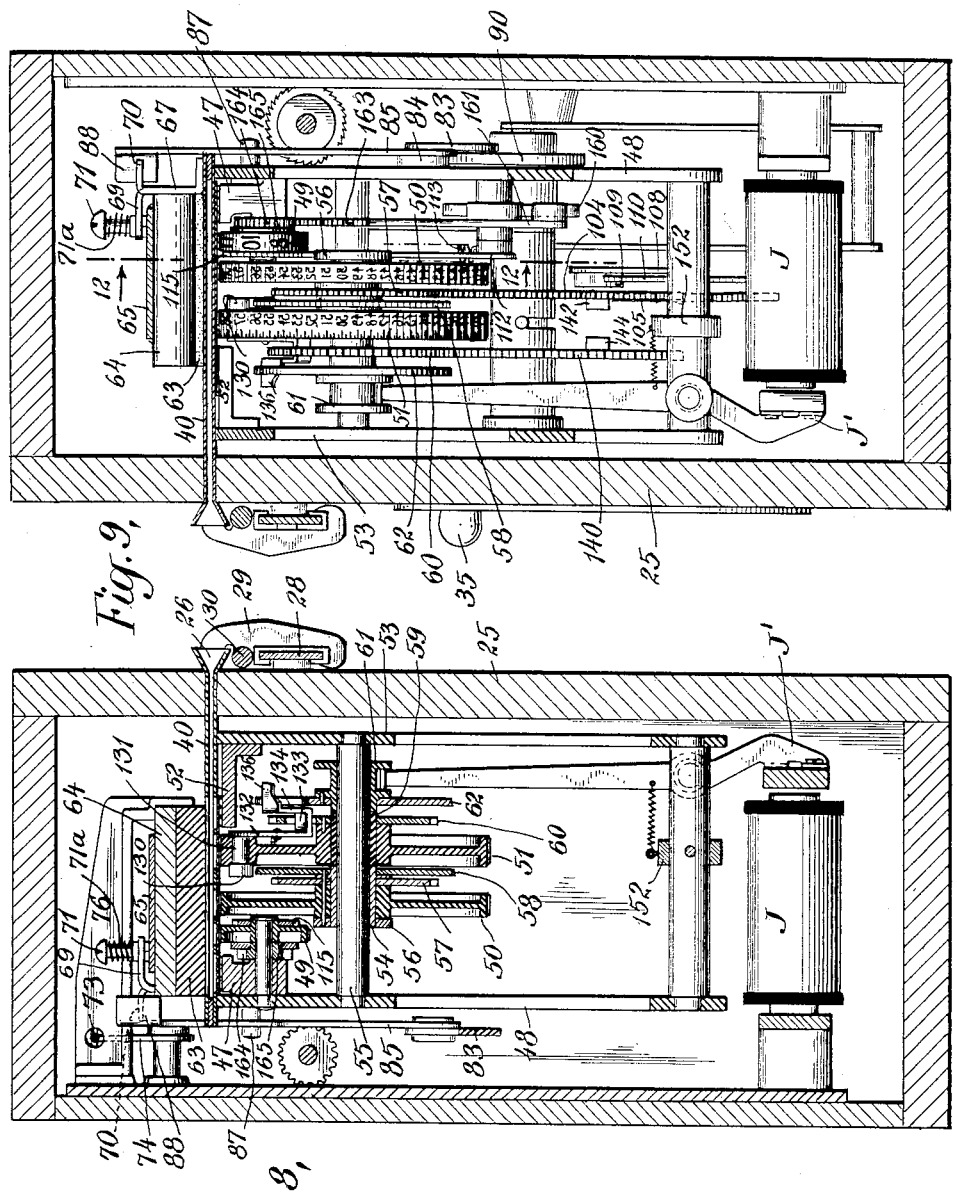
WITNESSES:
W P Johnson
A A Dunham
INVENTOR
Clinton E. Larrabee
BY
Kerr, Page, Cooper & Hayward
his ATTORNEYS

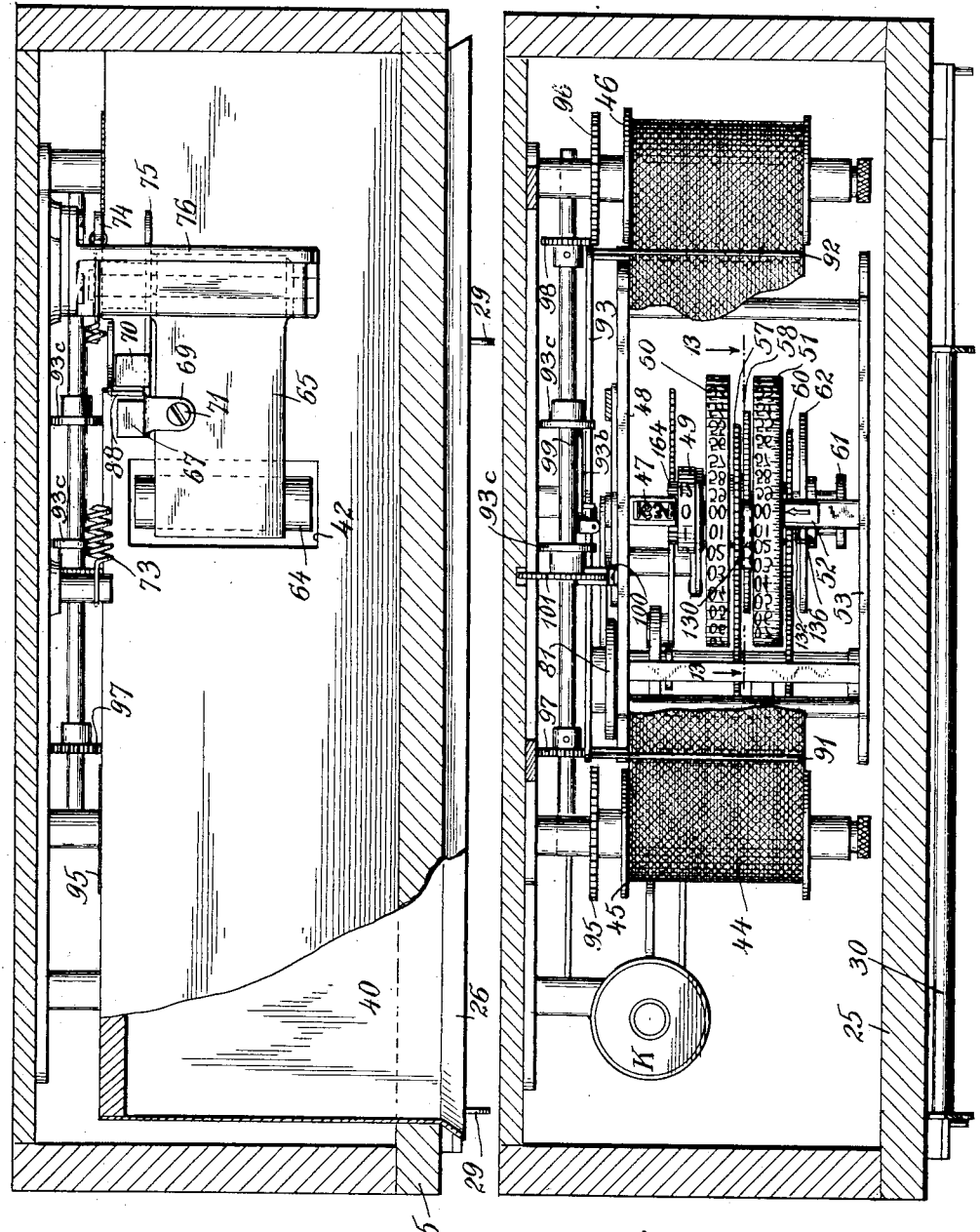

C. E. LARRABEE.
TIME RECORDER FOR VEHICLES.
APPLICATION FILED JUNE 21, 1911.
1,133,045.
Patented Mar. 23, 1915.
12 SHEETS—SHEET 9.
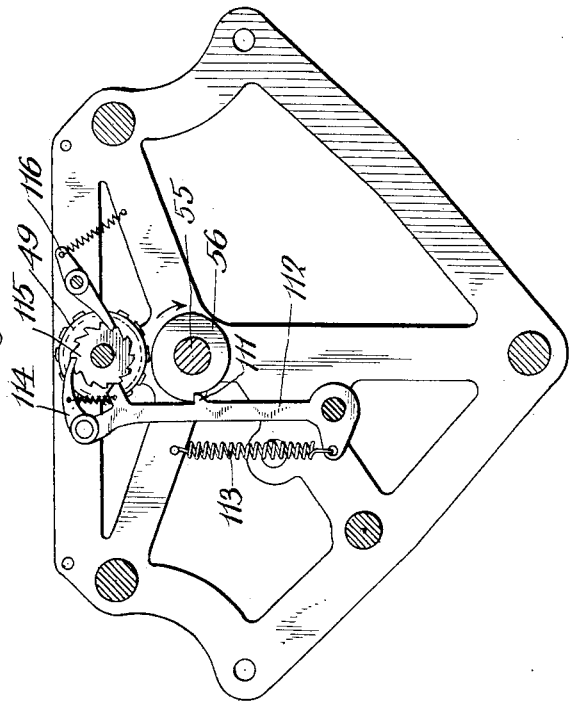
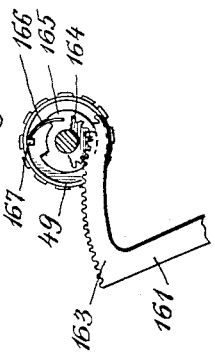
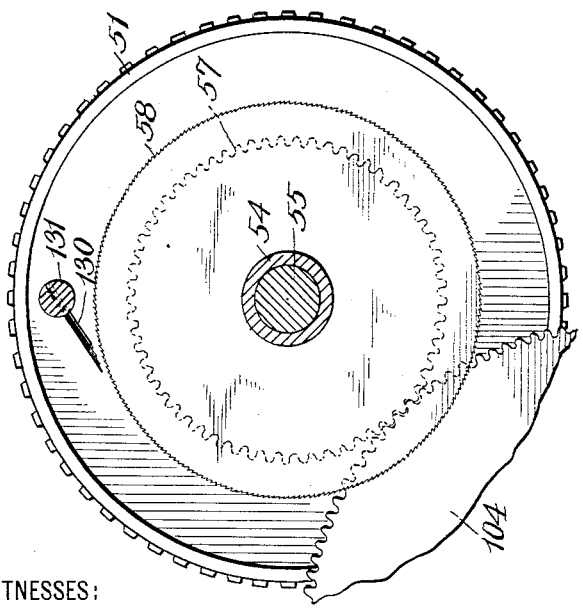
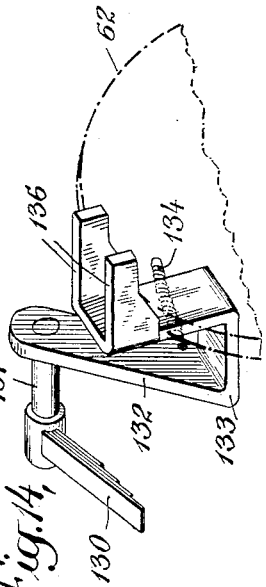
WITNESSES:
INVENTOR
Clinton E. Larrabee
BY
Kerr, Page, Cooper & Haywood
his ATTORNEYS C. E. LARRABEE.
TIME RECORDER FOR VEHICLES.
APPLICATION FILED JUNE 21, 1911.
1,133,045.
Patented Mar. 23, 1915.
12 SHEETS—SHEET 10.
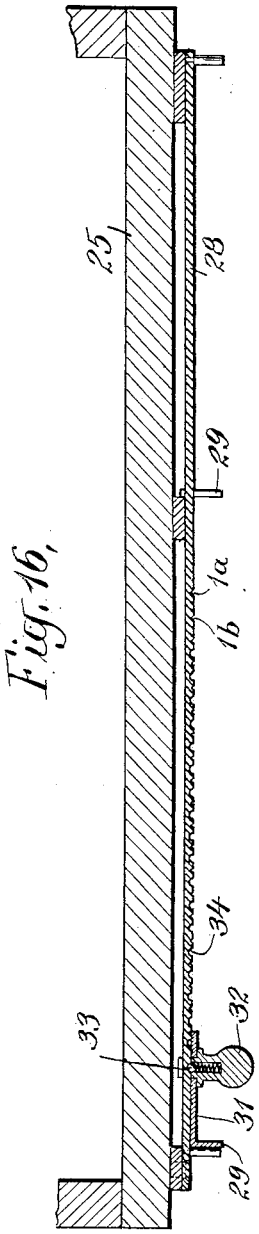
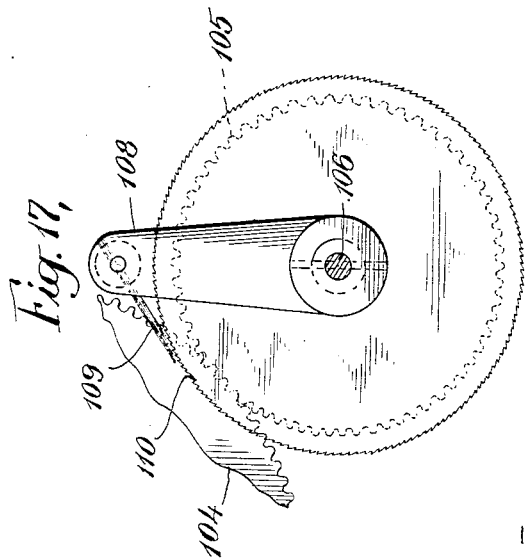
WITNESSES:
INVENTOR
Clinton E. Larrabee
BY
Kerr, Page, Cooper & Haywood
his ATTORNEYS

C. E. LARRABEE.
TIME RECORDER FOR VEHICLES.
APPLICATION FILED JUNE 21, 1911.

1,133,045.

Patented Mar. 23, 1915.
12 SHEETS—SHEET 11.

WITNESSES:

W P Johnson
S S Dunham

INVENTOR
Clinton E. Larrabee
BY
Kerr, Page, Cooper & Hayward
his ATTORNEYS

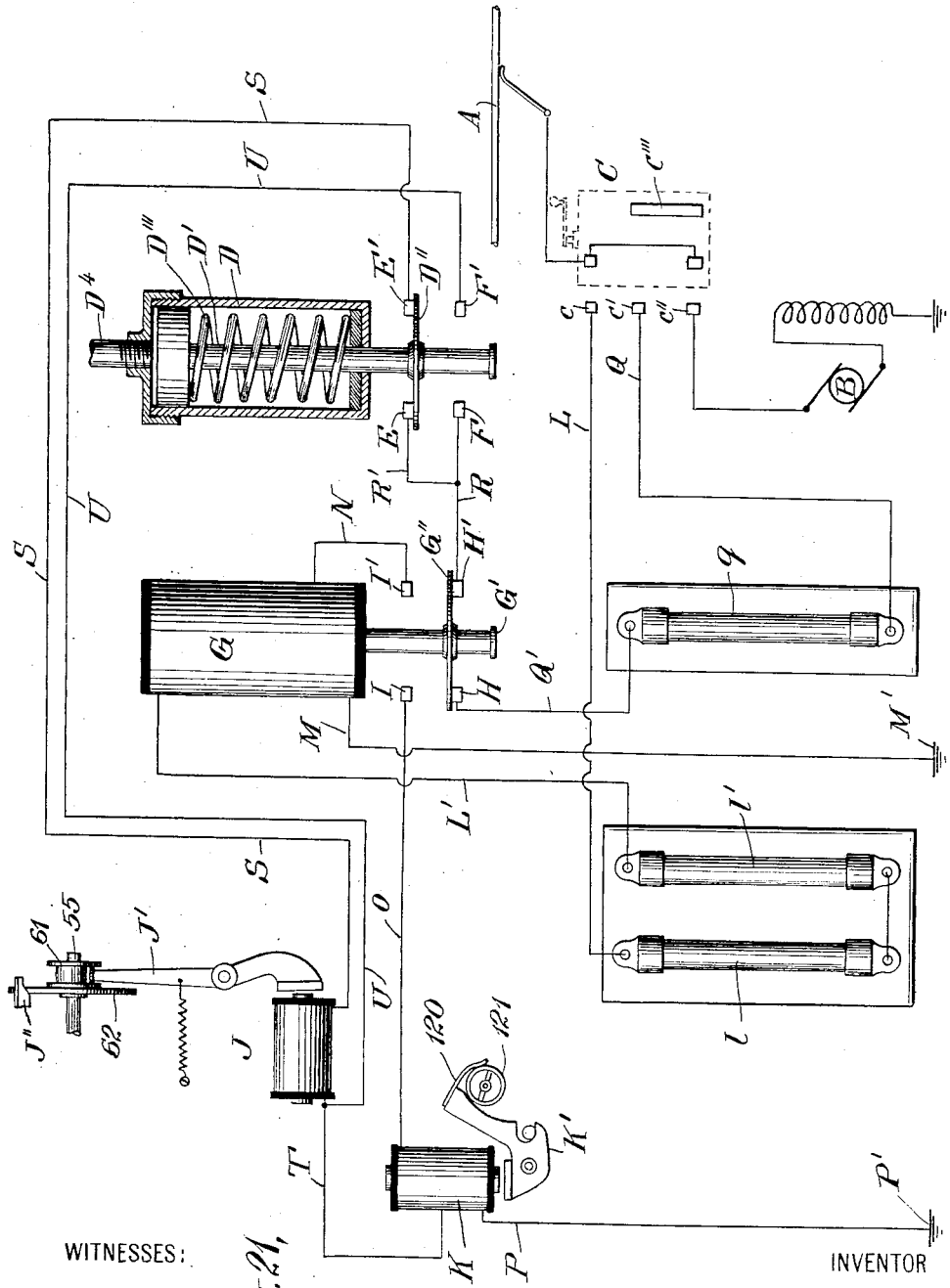

UNITED STATES PATENT OFFICE.

CLINTON E. LARRABEE, OF BINGHAMTON, NEW YORK, ASSIGNOR TO INTERNATIONAL TIME RECORDING COMPANY OF NEW YORK, OF ENDICOTT, NEW YORK, A CORPORATION OF NEW YORK.

TIME-RECORDER FOR VEHICLES.

1,133,045.   Specification of Letters Patent.   Patented Mar. 23, 1915.

Application filed June 21, 1911. Serial No. 634,454.

*To all whom it may concern:*

Be it known that I, CLINTON E. LARRABEE, a citizen of the United States, residing at Binghamton, county of Broome, and State of New York, have invented certain new and useful Improvements in Time-Recorders for Vehicles, of which the following is a full, clear, and exact description.

This invention relates to "coasting" time recorders, to record the time during which a car or train is moving under its own momentum with the brakes off, and its chief object is to provide an improved apparatus by which a record may be made not only of the time expended in "coasting," but also of the total time the car or train is in motion, whether with brakes on or off, or whether or not it is taking power from the source.

To this and other ends the invention consists in the novel features of construction and combinations of elements hereinafter described.

A convenient and effective form of the invention is illustrated in the accompanying drawings, in which is shown a recorder designed for use with an electrically propelled vehicle, for example a railway car. For the sake of brevity, permissible variations and modifications will not be referred to in the subjoined description, but it will be apparent to persons skilled in the art that many variations and modifications in the mechanisms herein specifically illustrated are permissible. In short, the invention is by no means limited to the precise construction shown, but may be embodied in numerous forms without departure from its proper spirit and scope as defined by the appended claims.

Figure 2:
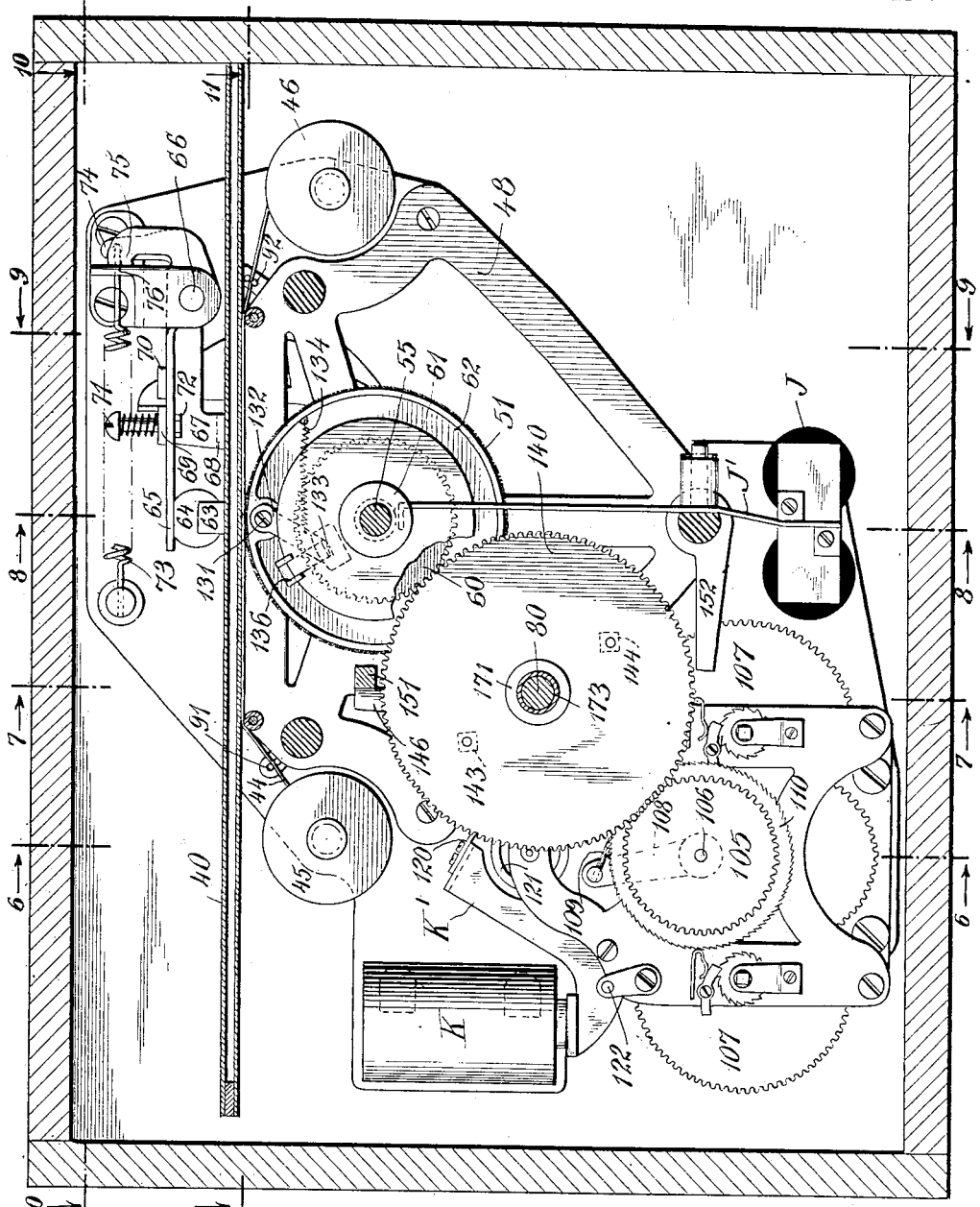
Figure 3:
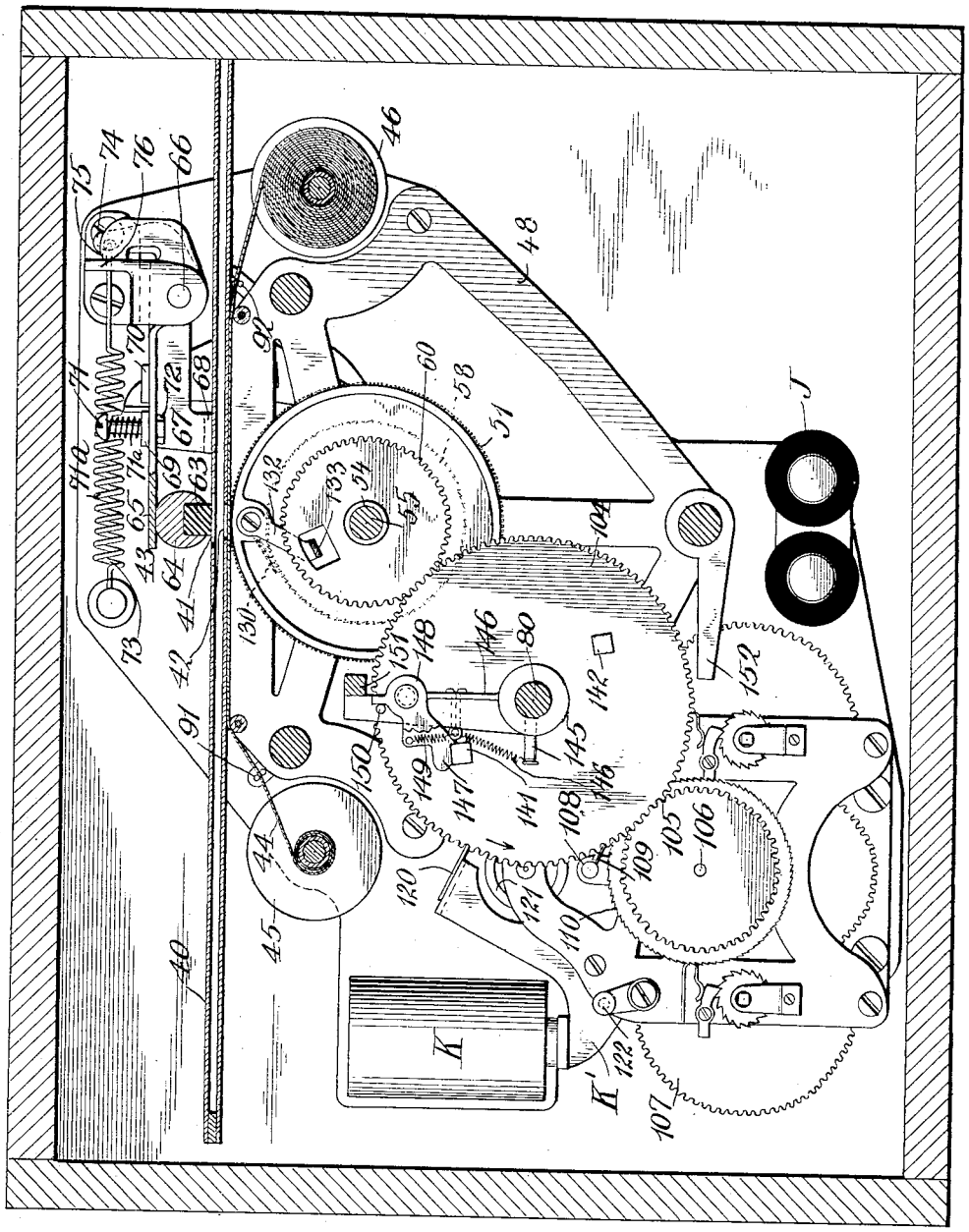
Figure 4:
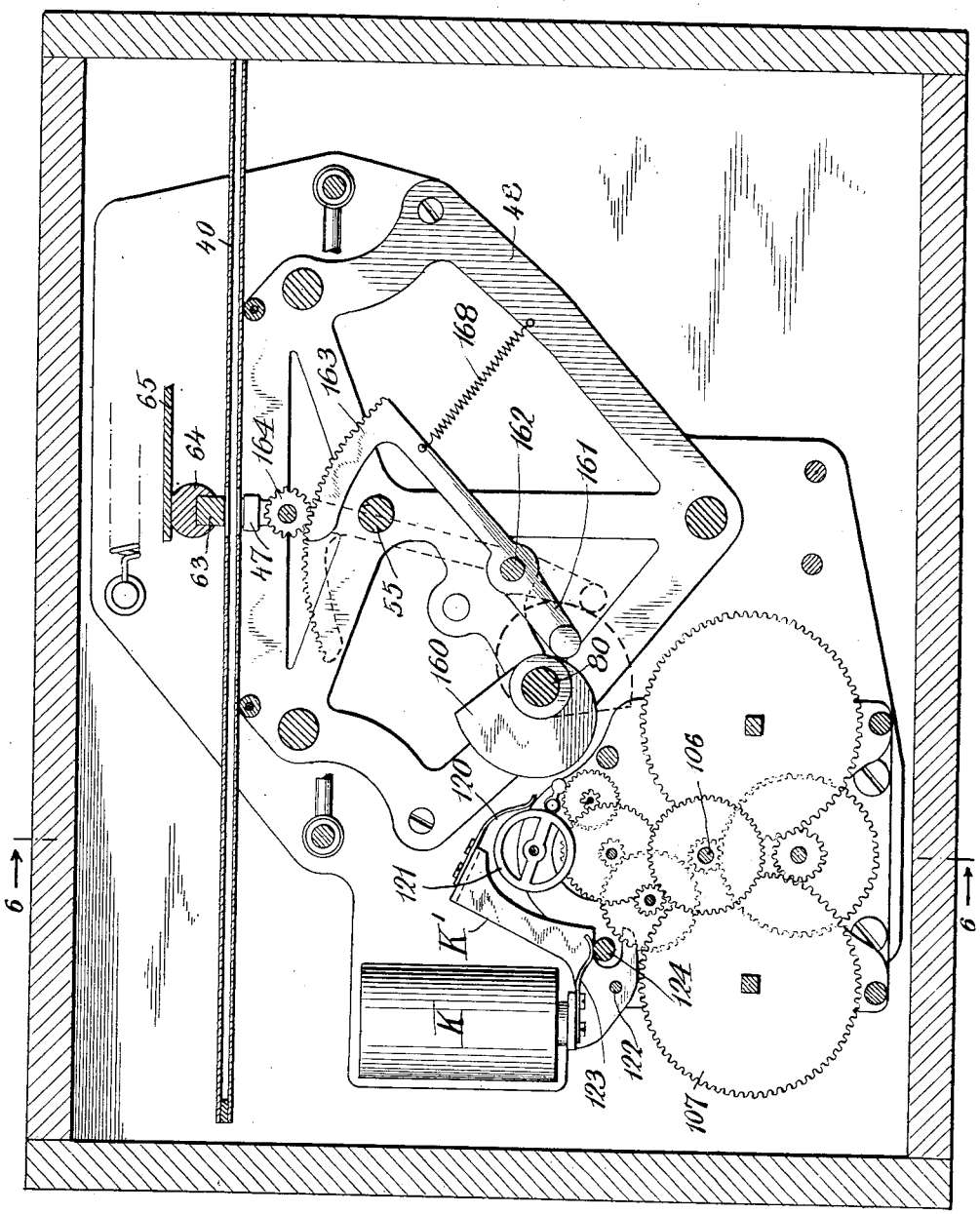
Figure 5:
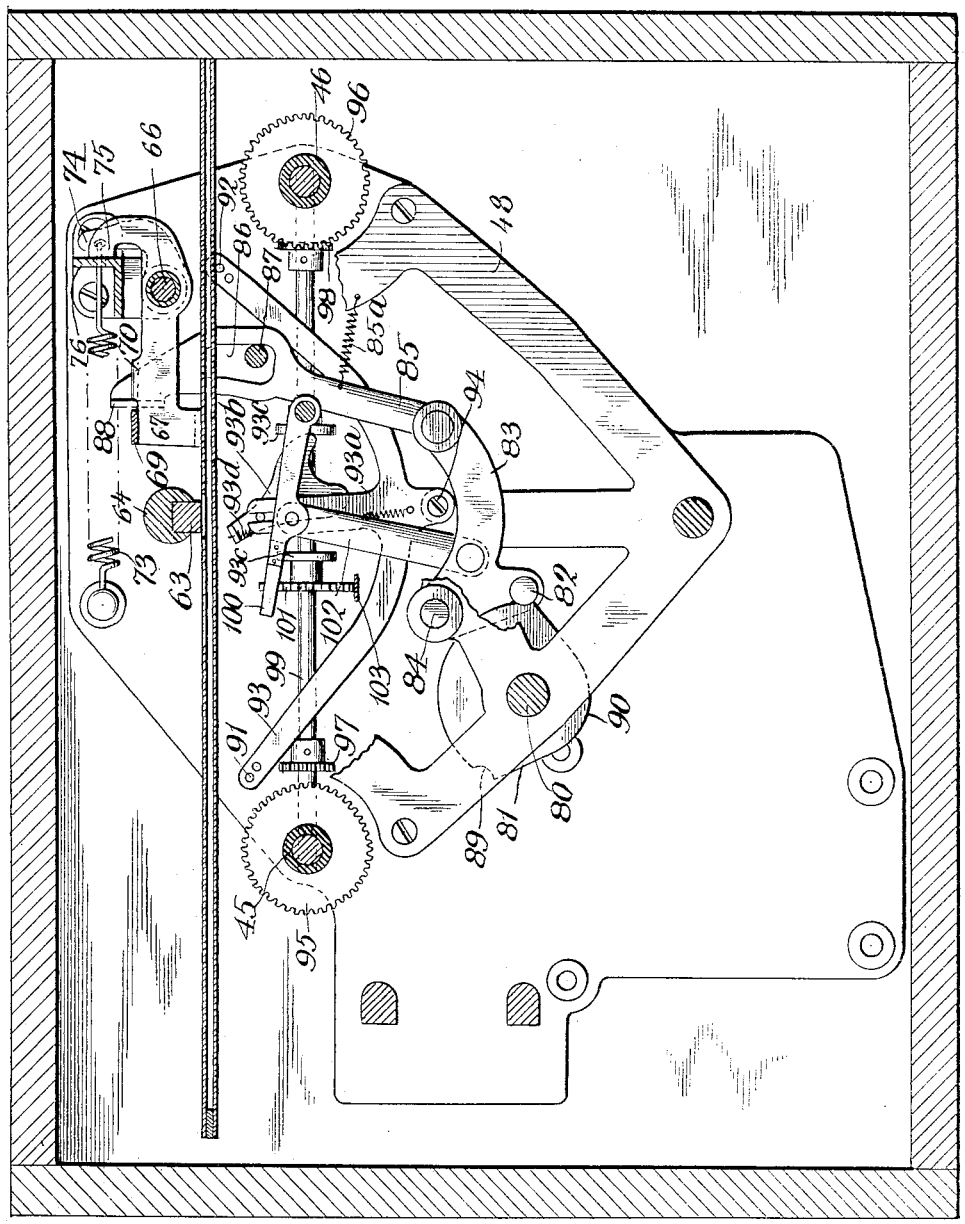

Referring now to the drawings, Figure 1 is a front view of the casing in which the mechanism is inclosed, showing the motorman's handle and the slot in which the record cards are inserted to receive the time imprints. Fig. 2 is a front view of the device with the front casing and controlling levers, as shown in Fig. 1, removed. It is a section taken on line 2—2 of Fig. 6. Fig. 3 is a front section taken on lines 3—3 of Fig. 6. Fig. 4 is a sectional view taken on line 4—4 of Fig. 6. Fig. 5 is a sectional view taken on line 5—5 of Fig. 6. Fig. 6 is an end sectional view taken on line 6—6 of Figs. 2 and 4. Fig. 7 is a sectional view taken on line 7—7 of Fig. 2. Fig. 8 is a sectional view taken on lines 8—8 of Fig. 2. Fig. 9 is a sectional view taken on lines 9—9 of Fig. 2. Fig. 10 is a top view of the device with the casing removed, taken on line 10—10 of Fig. 2. Some of the parts have been broken away to show the construction. Fig. 11 is a top view of the device taken on line 11—11 of Fig. 2. Part of the inking ribbon has been broken away to show the construction beneath. Fig. 12 is a detail view of the mechanism by which the hour wheel of the running-time printing wheels is actuated intermittently and step-by-step by the minute wheel. Fig. 13 is a detail view of the ratchet and pawl for driving the coasting-time printing wheel. Fig. 14 is a detail view in perspective, of the pawl shown in Fig. 13, and the devices by which the pawl is disengaged from the associated ratchet when the car ceases to coast. Fig. 15 is a detail view of a portion of the mechanism by which the hour wheel of the running-time printing wheels is brought to zero position. Fig. 16 is a detail sectional view on line 16—16 of the graduated bar on which slides the card-guide for properly positioning the record card to receive an imprint. Fig. 17 is a detail view of the ratchet and pawl by which motion is transmitted from the clock to the minute wheel of the running-time printing wheels. Fig. 18 is a detail view of a portion of the mechanism by which the minute printing wheels are brought to zero position. Fig. 19 shows a record card bearing the imprint made when the car begins its trip. Fig. 20 shows the same card and the same record, together with the record made when the trip is completed, giving directly the time during which the car was actually in motion, whether coasting or not, and also the time during which the car coasted. Fig. 21 is a diagram showing the electrical or electromagnetic devices employed in and in conjunction with the present apparatus, and the circuits or wiring thereof.

The present embodiment of the invention is electrically controlled, through the agency of suitable electromagnets. The subjoined explanation of the construction and operation of the apparatus will be more readily understood if the following brief description of the electrical controlling instrumentalities is kept in mind.

The wiring and the electromagnetic devices employed in the machine are illustrated diagrammatically in Fig. 21, to which reference is now made. In this figure A represents the trolley wire or third rail as the case may be, from which current is supplied to the driving motor B through a suitable controller indicated diagrammatically at C. The brake cylinder D of the air brake system of the car has a piston rod D' carrying a bridge piece D'' between two pairs of contacts E, E', and F, F'. When the brakes are "off" the piston is retracted by the spring D''' and the bridge piece is brought against the upper pair of contacts E, E'; but when compressed air is supplied to the cylinder through the pipe D⁴ to apply the brakes the outward movement of the piston brings the bridge piece against the lower contacts F, F'. The solenoid G has a plunger G' provided with a bridge piece G'' which, when the solenoid is deënergized, rests upon the two lower contacts H, H', but bears against two upper contacts I, I', when the solenoid is energized. The electromagnet J actuates an armature J', which in turn actuates a clutch, shown in part at J'', controlling the operation of the coasting-time printing wheel hereinafter described. The electromagnet K, having an armature K' controls, through instrumentalities hereinafter described, the running of the clock and the time printing wheels which record the total time during which the car is in motion, whether coasting or running with current "on" or brakes "on." Suppose now that the controller C is turned to an "on" position, connecting the trolley line with contacts c, c''. Current then flows through the motor B and drives the car; but current also flows from contact c through wire L, resistances l, l', wire L', to and through the solenoid G and thence by wire M to ground M'. Thus energized, the solenoid brings the bridge piece G'' up against contacts I, I', and so permits current to flow also from the solenoid through wire N, contact I', bridge piece G'', contact I, wire O, magnet K and wire P to ground P'. This energizes the magnet K, and starts the clock and the running-time printing wheel or wheels. Assume now that the motorman throws off the current at the controller, allowing the car to coast. The circuit through the solenoid G being broken at contact c, the solenoid is deënergized, allowing the bridge piece G'' to drop upon contacts H, H'. This breaks the circuit previously traced through the running-time magnet K, but another circuit through the magnet is simultaneously established, as follows: As soon as the circuit from the trolley wire is broken, thereby allowing the car to coast, the motor B, driven by the forward movement of the car, begins to act as a generator, sending current through contacts c'', c''', c', wire Q, fuse q, wire Q', contact H, bridge piece G'' (in its lower position by reason of the deënergization of the solenoid G), contact H', wires R, R', contact E, bridge piece D'' (the brakes being off and hence the bridge piece raised), contact E', wire S, coasting-time magnet J, wire T, running-time magnet K, and wire P to ground P'. The coasting-time magnet J is thus energized and the coasting-time printing wheel begins to turn. At the same time the running-time magnet K is also energized, allowing the running-time printing wheel to continue to turn. When the car comes to rest, without the brakes being applied, the motor of course no longer acts as a generator, and hence no current flows through the magnets J and K. The coasting-time and the running-time printing wheels thus come to rest. Suppose, however, that before the motor ceases to deliver current to the two magnets just mentioned the brakes are applied. The coasting, properly so-called, immediately ceases, since part of the energy of the moving car is being expended in the brake-shoes, and hence the coasting-time printing wheel must be arrested; but the car is still in motion, and hence the running-time printing wheel must continue to turn. This is effected as follows: The brakes being "on" the bridge piece D'' is bearing on contacts F, F', and therefore the current through Q, q, Q', H, G'', H', cannot flow from contact E to contact E', and thence by wire S to magnet J as formerly, permitting the coasting-time printing wheel to run, but must flow now from wire R to contact F, through bridge piece D'', contact F', through the shunt wire U past the magnet J, and through wire T, magnet K, and wire P to ground P'. The magnet J is thus cut out of the circuit, but magnet K is kept in. When, however, the motor B ceases to send current through the circuit the magnet K is of course deënergized, and as a result the running-time printing wheel is arrested. The parts are then in their initial and inactive position, shown in Fig. 21.

From the foregoing it will be apparent that so long as the car is in motion the magnet K is energized, either from the line or from the motor acting as a generator, so that the running-time printing wheel is always turning while the car is moving. On the other hand, the magnet J, controlling the coasting-time printing wheel, is never energized except when the car is coasting (brakes "off") and then only by current from the motor acting as a generator. It will also be seen that when the car comes to rest, with the brakes either on or off, both magnets are deënergized and both printing wheels are arrested.

The various mechanisms composing the machine are mounted in or upon a suitable casing 25, shown in front elevation in Fig. 1, having a long, narrow, horizontal slot 26 to receive the card 27 on which the records are to be printed. Immediately below this slot is a long flat graduated bar 28 spaced slightly from the front of the casing, as shown in Figs. 8, 9 and 16, to permit two card guides 29 to slide on said bar. These card guides are spaced a fixed distance apart (equal to the length of the card) by a rod 30. Attached to the left hand guide 29 is an index 31 having a knob 32 by which the guide frame, composed of the guides 29 and rod 30, can be accurately positioned with respect to the graduations on the bar 28, which graduations are numbered, as shown, to designate the different trips which the car is to make in a known period, for example one day. To prevent accidental displacement of the guide frame the pointer or index 31 is provided with a spring-pressed ball 33 adapted to engage any one of a series of depressions 34 in the face of the bar 28. It will therefore be seen that a light blow on the knob or frame, or the jolting of the car, will not cause the frame to move, but that when sufficient force is applied to the knob the ball will be cammed out of the depression. It will also be seen that the ball aids in positioning the guide frame, since the ball will strike and snap into a depression when the pointer is in accurate position.

When the car starts on its first trip the motorman shifts the guide frame to the extreme right, bringing the index 31 to the right-hand line, 1ª, of trip 1 graduation. He then inserts into the slot between the guides 29 the card 27, face down and with the top of the card toward the left. Grasping the operating lever or crank 35 he turns it counterclockwise till it is arrested by the stop 36. This movement of the handle, through the instrumentalities hereinafter described, causes to be printed on the card the number of the car (under the heading "Car number" in Figs. 19 and 20), zero in the column appropriated to the running time or total time the car is in motion; and, in the column for coasting time, zero, together with a portion 37 of a scale of quarter-minutes and an arrow 38, the latter being printed from a type which is stationary with respect to the movable wheel which prints the coasting time and the scale.

When the car arrives at its destination, that is, at the end of the trip, the motorman moves the guide frame leftward till the index 31 points to the line 1ᵇ. He then inserts the card again, in the same manner as before, and moves the handle 35 clockwise from the stop 36 to the stop 39. This latter movement prints on the card the car number, the total running time, and the total coasting time, with the arrow and a portion of the scale; the whole minutes of the coasting time being printed and fractions of minutes indicated by the scale and arrow. Thus in Fig. 20 the total running time is shown to be one hour and sixteen minutes, of which thirty-one and three-fourths minutes were spent in coasting.

When starting on the second trip the motorman moves the guide frame to the "leaving" line of trip 2 graduation, and actuates the handle 35 as before. Each movement of the handle counterclockwise at leaving restores the time printing wheels to zero before the printing takes place. Hence the first record for each trip, whether the first, last, or any intermediate trip, is always zero in both record columns, so that the total elapsed time of running and coasting can be read directly from the record without subtraction or addition. If desired the back of the card may also bear a printed form like that on the front, in which case the card can be reversed in the chute after the tenth trip and the records for succeeding trips then printed on the back. The graduations on bar 28 can be correspondingly numbered, as shown in Fig. 1. The general operation of the instrument having been explained, the construction and operation of the various coöperating mechanisms by which the several functions of the machine are performed will be readily understood.

*The printing mechanism.*—The chute 40, which lines the slot 26, has apertures 41, 42, (Fig. 3) at the printing point, and above the first of these apertures is the printing hammer 43 and below the second are the types, some stationary, others on the periphery of the time-printing wheels. Between the chute 40 and the types runs an ink-ribbon 44, wound on spools 45, 46, so that as the hammer descends the card and the ribbon will be struck sharply against the types.

The types are shown clearly in Figs. 8, 9 and 11. The type which prints the car number is formed on a lug 47 fixed on the rear frame-plate 48. In front of this lug (to the righ as viewed in Fig. 8 and to the left in Fig. 9) is the wheel 49 for printing the hours of running time and the wheel 50 for printing the minutes of such time. Next comes the wheel 51 for printing the coasting time, bearing on its periphery the type for printing the whole minutes and the scale for indicating the fractions. Next after the coasting-record wheel is the type for printing the arrow or pointer, the same being formed on an arm 52 fixed on the front frame-plate 53. The printing wheel 50 is mounted on and pinned to a sleeve 54 rotatable on a stationary shaft 55, and fixed to the sleeve by the same pin is a cam 56, a gear wheel 57, and a fine-toothed ratchet wheel 58. On the same shaft is a sleeve 59, on which the coasting-record wheel 51 and a gear wheel 60 are mounted, the two wheels being pinned together as shown, so as to rotate together. Slidably mounted on the same shaft is a grooved collar 61, to which is fixed a disk 62, forming part of the clutch which is actuated by the armature J' of the coasting record magnet J.

The printing hammer 43 (Figs. 3, 5, 6, 7, 8, 9 and 10) has a yielding striking face 63 mounted in a bar 64, carried on the underside of one end of a plate 65 having at its other end depending ears (not shown) by which it is pivotally mounted on a stationary shaft 66. Pivoted at one side of this plate and on the same shaft is a lever 67 having a foot 68 which, by striking the chute 40, arrests the lever. On its upper edge the lever has a forwardly extending finger 69 and a rearwardly extending finger 70. The first named finger lies over the hammer plate 65 and has an aperture through which extends a screw 71 encircled above said finger by a coil spring 71$^a$. The screw also extends through the hammer plate 65, and below the same it is fitted with a stop-nut 72. It will therefore be seen that if the left hand portion of the lever 67 is raised, against the tension of the spring 73 attached to an arm 74 rigidly connected with the lever 67 on the same shaft 66, the hammer 43 will also be raised, through the instrumentality of the screw 71 and spring 71$^a$. If now the lever 67 is suddenly released the spring 73 will throw the lever 67 and hammer 43 downward, the lever being arrested at the end of its stroke by the stops 68 and 75 striking the chute 40 and the fixed member 76 respectively. The momentum of the hammer, however, will carry it on down against the tension of the spring 71$^a$ and cause it to deliver a sharp, quick blow on the card in the chute; but instantly after the delivery of the blow the tension of the spring 71$^a$ lifts the hammer to its initial position, shown in Figs. 2 and 3.

For the purpose of actuating the lever 67 in the manner described above, the following devices are provided, shown best in Figs. 5, 6 and 7. On the shaft 80, which is rocked by the handle 35 is a symmetrical cam 81 engaging a stud 82 on an arm 83 pivoted at 84. Pivotally connected to the free end of the arm 83 is an upwardly extending link 85 having an opening 86 embracing a fixed pin 87. This link is urged toward the right, as viewed in Fig. 5, by a spring 85$^a$ and at its top is formed with a vertical forwardly turned lip 88, which, in the position of the parts as shown in Fig. 5, bears against the rearwardly extending finger 70 on the lever 67 and so prevents the spring 85$^a$ from swinging the link to the right. Suppose, however, that the cam 81 is rotated counterclockwise by actuation of the handle 35: The notch in which the stud 82 rests (similar to the notch shown in dotted lines at 89) moves up from under the stud, and as the low portion 90 of the cam approaches the stud the arm 83 and link 85 descend, until finally the lip 88 passes below the finger 70, whereupon the spring 85$^a$ draws the link 85 to the right, the movement of the latter being arrested by the left side of the slot 86 striking the stop 87. The low portion of the cam now passes the stud 82 and the cam begins to swing the arm 83 upward, thus raising the link 85 and with it the lever 67, since, as will be remembered, the lip 88 is under the finger 70. At the same time, as the link rises it turns on the pin 87 as a fulcrum, carrying the lip 88 toward the left until it slips off the finger 70 and allows the lever 67 to descend under the influence of the spring 73. At this instant the notch 89 comes into engagement with the stud 82. It will of course be understood that the same actuation of the arm 83 and associated parts occurs when the cam 81, having been rocked in one direction, say counterclockwise as viewed in Fig. 5, is reversed to effect a second printing.

*The ribbon-shifting mechanism.*—The ribbon 44, wound on the two spools 45, 46, Figs. 3, 5, 6 and 7, passes between forks 91, 92, at the ends of a V-shaped yoke 93 pivoted centrally at 94. The spools 45, 46, are provided with gears 95, 96, and adjacent to these gears is a horizontal shaft 99 movable longitudinally and having pinions 97, 98, so positioned on the shaft that when the latter is in the position shown in Fig. 5, for example, with the pinion 98 in mesh with the gear 96, rotation of the shaft in the proper direction will cause the ribbon to be wound on the spool 46 and be unwound from the spool 45. On the other hand, if the shaft be shifted toward the left, bringing the pinion 97 into mesh with the gear 95 and disengaging pinion 98 from gear 96, rotation of the shaft in the same direction as before will wind the ribbon on spool 45 and unwind it from spool 46. This rotation of the shaft, always in the same direction, is effected by a pawl 100 engaging a ratchet 101 on the shaft and oscillated by a link 102 connected to the arm 83, which, it will be remembered, is actuated by the cam 81. It will therefore be seen that at each printing operation, immediately before the impression is made, the shaft 99 is given a slight turn, thereby advancing the ribbon one step and bringing a fresh portion thereof to the printing point. Movement of the shaft in the backward direction is prevented by a holding pawl 103 engaging the ratchet.

Near each end of the ribbon it is provided with a knot or stop, not shown, one of which, as the ribbon unwinds from a spool, engages the adjacent fork 91 or 92, as the case may be, and swings the yoke 93 in the corresponding direction. This yoke has a central vertically extending finger 93$^a$ slotted at its upper end to receive a pin on a lever 93$^b$ playing between two collars or flanges 93$^c$ on the shaft 99 and having a spring 93$^d$ which serves to throw the lever either to its extreme rightward or its extreme leftward position. Suppose now, with the parts in the position shown in Fig. 5 and the ribbon traveling from left to right, that the knot at the left end of the ribbon strikes the fork 91. The yoke 93 is thereby swung clockwise, imparting a like movement to the lever 93$^b$. As soon as the latter passes its dead center the spring 93$^d$ completes the movement, throwing the lever over against the right-hand collar 93$^c$ and shifting the shaft 99 to the left. This disengages pinion 98 from gear 96 and brings pinion 97 into mesh with gear 95, as previously explained, thereby reversing the direction of the ribbon's travel.

*The mechanism for driving the running-time printing wheels.*—The minute wheel 50, Figs. 8 and 9, is, it will be remembered, pinned to a gear wheel 57. The latter is in mesh with a large gear 104, Fig. 3, which is in turn driven by a gear 105 loosely mounted on the minute arbor 106 of the clock movement 107. Rigidly mounted on this arbor is an arm 108, Fig. 17, carrying a multi-point spring-pawl 109 engaging a fine-toothed ratchet 110 loose on the minute arbor but fixed to the gear 105. It will therefore be seen that as the arm revolves the train of gears 105, 104 and 57 will be driven, thereby rotating the minute wheel 50. The advantage of using a fine-toothed ratchet and a multi-point pawl will be explained hereinafter. The hour wheel 49 is moved one step forward at each complete revolution of the minute wheel 50, and for this purpose the devices shown in detail in Fig. 12 are provided. The cam 56, which, as before stated, is pinned to the minute wheel 50, is of the snail type and engages a lug 111 on a vertical arm 112 pivotally mounted at its lower end and urged toward the right, as viewed in Fig. 12, by a coil spring 113. At the top of the arm is an actuating pawl 114 coöperating with a ratchet 115 fixed to the hour wheel 49 and having the same number of teeth as there are hour-type on the wheel. It will now be seen that as the cam revolves, in the direction of the arrow, the arm will be swung leftwardly, thereby retracting the pawl. Finally, as the cam completes its revolution, the tail of the cam passes the lug 111 and the latter drops off, permitting the spring 113 to swing the arm to the right and advance the pawl, thereby giving the ratchet and the hour wheel a partial movement of rotation sufficient in extent to bring the next hour-type to the impression point. Backward movement of the hour wheel is prevented by a holding pawl 116 engaging the ratchet.

*The mechanism for stopping the clock and the running-time printing wheels when the car stops.*—As before stated, the operation of the running-time printing wheel is under the control of the magnet K, and it has been explained how this magnet is energized only while the car is in motion. It will also be remembered that the running-time printing wheel is always revolving while the clock is running; and as the motion of the coasting-time printing wheel 51 is derived from the clock also, it is evident that stopping of the clock when the car stops will stop both printing devices, as should, of course, be the case. For this purpose the armature K' (Fig. 4) of the magnet K is provided at its upper end with a light blade spring 120, extending into close juxtaposition to the balance wheel 121 of the clock and so arranged that when the magnet is deënergized the counterclockwise movement of the armature on its pivot 122 caused by the spring 123, carried by the armature and bearing upon a fixed stud 124, will bring the spring-stop 120 into engagement with the balance wheel and so arrest the latter. When, however, the magnet is energized by current from the trolley line or by current from the motor acting as a generator it reverses the movement of the armature, which reversal carries the spring 120 away from the balance wheel, as in Fig. 4, and leaves the wheel free to oscillate.

*The mechanism for driving and controlling the coasting-time printing wheel.*—On the shaft 55 (Figs. 3, 8, 9), which carries the running-time and the coasting-time minute-printing wheels, is a gear 57 and a fine-toothed ratchet 58, both pinned to the running-time minute wheel 50, as already described. Near its periphery the coasting-time wheel carries a multipoint spring-pawl 130, mounted on a stem 131 rotatively movable in said wheel, said pawl being adapted to engage the ratchet 58. It will therefore be seen that with the pawl in engagement with the ratchet the motion of the gear 57, which is driven by the clock 107, is communicated to the coasting-time printing wheel. It will also be apparent that if the pawl 130 is lifted out of engagement with the ratchet 58 the coasting-time printing wheel will cease to revolve. To effect this movement of the pawl the following devices are provided. Extending inwardly and laterally from the stem 131 and fixed thereto is an arm 132 having at its inner end a horizontal portion 133 extending forwardly through an opening in the gear 60, which, it will be remembered, is pinned to the coasting-time wheel 51. At the forward end of this horizontal portion is an outwardly extending arm 134 which is also inclined, but in the opposite direction, to the arm 132, and at the outer end of the arm 134 are two forwardly projecting fingers 136 lying close to the periphery of the disk 62 and having an inclined cam portion with which said disk engages when shifted on the shaft 55 by the armature J′ coöperating with the grooved collar 61. When the magnet J is energized, as is always the case when the car is coasting, the disk 62 is in its rightward position (as viewed in Fig. 8), and is therefore out of engagement with the pawl-operating fingers 136; but when the car ceases to coast and the magnet is therefore deënergized the armature J′ forces the disk to the left and against the inclined cam portions of the said fingers and, through the instrumentality of the arms 132 and 134, lifts the pawl 130 out of engagement with the driving ratchet 58. Whereupon the coasting-time printing wheel ceases to rotate.

Inasmuch as coasting-time printing wheel 51 is driven by a ratchet-and-pawl mechanism and may have to be set in motion at any time in the course of the car's travel, and since the ratchet itself is always revolving when the car is in motion, it will be seen that at the instant the pawl 130 is moved toward the ratchet to start the coasting wheel the ratchet may not be in the exact position at which the pawl would come directly into engagement with a ratchet tooth. Consequently the ratchet would have to turn idly a greater or less distance until a tooth did come into contact with the pawl. This means a loss of time from the coasting record, the maximum loss at any given operation of the parts being dependent upon the distance between successive teeth. To make this maximum as small as possible the number of teeth on the ratchet is made large (two hundred and forty in the present instance) and hence close together. This would of itself reduce the maximum loss to 1/240 of the time represented by a complete revolution of the coasting record wheel, amounting to 1/240 of 60 minutes, or ¼ of a minute in the present case, in which one turn of the wheel represents one hour's coasting. Assuming that the maximum loss would occur as often as the minimum or zero loss it will be seen that the average loss would, in general, be at least ⅛ of a minute, even when neglecting the losses which are each greater than zero but less than the maximum. The total loss in the course of even a short trip might therefore amount to several minutes in the aggregate. To reduce still further the maximum loss, and hence the average loss, is the purpose of employing a multi-point pawl 130. In the present case the successive points of the pawl are spaced apart a distance equal to one and one-fourth of the space between successive teeth on the ratchet, so that one or another of the points will, when the pawl is actuated, strike the ratchet at a point distant from a tooth not more than one-fourth the space between teeth. This is equivalent to increasing the number of teeth to 960, making the maximum loss 1/960 of 60 minutes or $\frac{1}{16}$ minute, and making the average loss, computed roughly, as above, $\frac{1}{32}$ minute, or somewhat less than two seconds. For the same purpose the fine-toothed ratchet 110 and the multipoint pawl 109 are employed to drive the running-time printing wheel 50.

*The mechanism for returning the time-printing wheels to zero, so that elapsed time may be read directly from the record.*—Facing the large gear 104 (Figs. 3, 6, 7 and 18), on the same shaft 80, is a similar gear 140, meshing with the gear 60, which, it will be remembered, is pinned to the coasting-time printing wheel 51. This gear 140 is loosely mounted, so as to turn freely as the gear 60 revolves. Each gear is provided on its inner face with a pair of square studs, 141, 142, 143, 144, so that by engaging one or another of each pair of studs the gears 104 and 140 may be turned, in the direction of their movement when driven by the clock, until the zeros on the time-printing wheels 50 and 51 are brought to the impression point. In the present machine each of the large gears 104, 140, has twice the number of teeth as the smaller gears 57 and 105, and 60, with which they are in mesh, and consequently a half revolution of either large gear is the greatest movement that will ever be necessary to bring the associated time-printing wheel to zero position. Inasmuch as the shaft 80 makes more than a half turn, this movement may be availed of, as follows, to effect the desired movement of the gears 104 and 140 to re-set the printing wheels.

On the shaft 80, between the two gears 104 and 140, and straddling a pin 145, is an arm 146, carrying near its outer end a pair of pawls 147, 148, drawn inwardly by springs 149 to inward positions determined by a pair of stops 150 on said arm. These pawls are provided at their free ends with square notches adapted to fit the square stud 141, 142, 143, 144, and all the parts are so proportioned and arranged that when the handle 35 is at the leaving position, as in Fig. 1, and the time-printing wheels are at zero, the arm 146 will be upright and bearing against a stop 151 above the two gears 104, 140, and the latter, if at zero, will be in such positions that one or the other of each pair of studs will be in engagement with the appropriate pawl, as indicated in Fig. 3. Starting now on a trip, the motorman gives the handle 35 a half-turn counter-clockwise, as previously described, thereby giving the arm 146 a half turn, which, through the instrumentality of the pawls 147, 148 and the studs 141, 143, gives the gears 104, 140 each a half turn and the gears 57 and 60 each a full turn, moving the time-printing wheels each a full revolution from zero back to zero. At the same time the arm 146 comes against a stop 152 below the gears 104, 140. As the movements just described are completed the printing hammer descends and prints zero in each time-record column on the card. The car now makes its trip, during which the gear 104 of course moves (the extent of its rotation depending upon the time during which the car was actually in motion), thereby carrying the stud 141 or 142, as the case may be, away from the pawl 147. Similarly, if the car has done any coasting, the gear 140 has turned more or less, carrying the stud 143 or 144 away from the pawl 148. When the destination is reached the motorman swings the handle 35 back to its initial position, thereby turning the arm 146 clockwise and back to the position shown in Fig. 3, during which movement the pawls swing idly over the studs which may lie in their paths. This actuation of the handle prints the elapsed running time and coasting time, but leaves the time-printing wheels in the positions they happen to be in when the car stops; that is, the zeros are not at the impression point. Now when the car leaves again and the motorman operates the handle to print the zeros, as previously described, the arm 146, turning, in the counterclockwise direction, picks up the studs which lie in the path of the pawls 147, 148, and sweeps the gears 104, 140 on around, bringing the type wheels 50 and 51 to zero point before the printing hammer descends. In this manner the minute-printing wheels are brought to zero position each time the handle is moved from the "leaving" position. If, however, the total running time of a trip has been more than an hour, represented by one revolution of the minute wheel 50, the hour wheel 49 will have been advanced one or more steps, and hence must also be brought back to zero. This is effected by the following devices, shown clearly in Figs. 4, 8, and 15. On the shaft 80 is a snail cam 160 adapted to engage and actuate the lower end of lever 161 pivoted at 162 and having at its upper end an arc shaped rack 163 in mesh with a pinion 164 loose on the small shaft which supports the hour wheel 49. Fixed to the pinion is a small disk 165 having a cutaway portion from which projects a spring pawl 166. On the inside of the overhanging periphery of the hour wheel is a suitably positioned stud 167, adapted to be engaged by the pawl just mentioned.

As the hour wheel is revolved step-by-step (counterclockwise as viewed in Fig. 15) by the actuating mechanism shown in Fig. 12, the stud 167 moves ahead of the pawl, but as the cam 160 is revolved by the handle 35 and shaft 80, when the car leaves, the half revolution of the cam swings the lever and rack to the position shown in dotted lines in Fig. 4, thereby revolving the pinion 164 in the clockwise direction and causing the pawl 166 to overtake the stud. The stud and the hour wheel are thus moved until the type immediately preceding the zero is at the impression point, the parts being designed and proportioned to leave the wheel in that position. At this instant the minute wheel 50 comes to zero, whereupon the transfer mechanism illustrated in Fig. 12 moves the hour wheel forward one step farther, as previously explained, thereby bringing the hour wheel zero to the impression point. The printing hammer now descends and prints the record. At this stage the cam 160 and the lever 161 are in the positions shown in dotted lines in Fig. 4. When, upon arrival at the destination of the car the motorman reverses the handle 35 the tail of the cam slips past the end of the lever, allowing the spring 168 to throw the lever and rack back to the positions shown in full lines in Fig. 4. During this movement of the rack the pinion 164 rotates counterclockwise, but as the pawl 116, Fig. 12, holds the hour wheel against movement in that direction, the spring pawl 166 sweeps idly past the stud 167.

Inasmuch as the gears 104, 140 should not turn while the shaft 80 is in motion, the gears are mounted on hubs 170, 171, which are in turn mounted on sleeves 172, 173, Fig. 7. The latter sleeve is extended into the front frameplate 53 and is fitted tightly therein so as not to move with respect to the shaft 80 and hub 171. The sleeve 172 is provided with an arm 174 extending upwardly and forked at the top to embrace the stop-bar 151, thereby holding said sleeve motionless with respect to the shaft 80 and hub 170.

As previously stated, the invention is not limited to the device herein specifically shown and described, but is capable of embodiment in other forms without departure from its proper spirit and scope as defined by the following claims.

I claim:

1. In a time recorder for vehicles, the combination of running-time printing devices for recording the total time the vehicle is traveling, actuating means for said devices, said means being dependent for operation upon travel of the vehicle and ceasing to operate when the vehicle ceases to travel, and coasting-time printing devices operative only when the vehicle is coasting.

2. In a time recorder for vehicles, the combination of driving and braking elements for the vehicle, running-time printing devices associated with such elements and operative only when the vehicle is traveling with either element in operation, and coasting-time printing devices associated with said elements and operative only when the vehicle is traveling with neither element in operation.

3. In a time recorder for vehicles, the combination of driving and braking elements, a clock, running-time printing devices driven by the clock, coasting-time printing devices driven by the first named devices, controlling mechanism associated with the clock and operating to allow the clock to run when the vehicle is in motion and to stop the clock when the vehicle stops, and controlling means associated with the driving and braking elements and with the coasting-time printing devices and operating to disconnect the latter from the running-time printing devices whenever either of said elements is in operation.

4. In a time recorder for electric vehicles, the combination of running-time printing devices for recording the total time the vehicle is traveling, electrically controlled driving means for said devices, a source of current for said means, delivering current only when the vehicle is in motion, coasting-time printing devices associated with said driving means, and controlling mechanism permitting the coasting-time printing devices to be driven only when the vehicle is coasting.

5. In a time recorder for electric vehicles, the combination of a braking element, a driving motor adapted to operate as a generator when driven by the movement of the vehicle, running-time printing devices for recording the total time the vehicle is traveling, electrical controlling means for said devices, connected with the motor whereby to be energized and cause the said devices to operate only while the vehicle is moving, coasting-time printing devices, electrical controlling mechanism therefor, associated with the motor to receive current only when the motor is acting as a generator, and means associated with the braking element and said electrical controlling mechanism to disconnect the latter from the motor when the braking element is in operation.

6. In a time recorder for electric vehicles, the combination of a clock, running-time printing devices and coasting-time printing devices driven by the power of the clock, electrical controlling means for the clock, a source of current for said means and delivering current thereto only when the vehicle is moving, electrical controlling mechanism for the coasting-time printing devices and associated with said source of current whereby to be energized only when the vehicle is moving, a braking element, and means actuated thereby to disconnect the said electrical controlling mechanism from the source of current when the braking element is in operation.

7. In a time recorder for vehicles, the combination of a clock, running-time printing devices driven by the clock, coasting-time printing devices driven by the first named devices, electrical controlling mechanism for the clock, means for delivering current to said mechanism only when the vehicle is moving, whereby the clock will run only when the vehicle is in motion, electromagnetic mechanism for disconnecting the coasting-time printing devices from the running time printing devices whereby the latter will cease to drive the former, a circuit for said electromagnetic mechanism and including the said source of current, a braking element, circuit-controlling means for said circuit, actuated by operation of the braking element to check the progress of the vehicle, and circuit-controlling means for said circuit, operative only when the vehicle is coasting with the braking element out of operation.

8. In a time recorder for vehicles, the combination of a clock, running-time-printing devices driven thereby, means for causing the clock to run only when the vehicle is moving, coasting-time printing devices, a ratchet and a pawl between the first named and the last named printing devices to drive the latter from the former, and means for causing the pawl to engage the ratchet when the vehicle is coasting and to be disengaged from the ratchet when the vehicle ceases to coast.

9. In a time recorder for vehicles, the combination of running-time printing devices, clock controlled means for driving the same only when the vehicle is moving, coasting-time printing devices, clock controlled means for driving the same only when the vehicle is coasting, mechanism for taking impressions from the said devices to record the running-time and the coasting time, and means actuated by said impression-taking means to restore the printing devices to zero.

10. In a time recorder for vehicles, the combination of running-time printing devices, clock controlled means for driving the same only when the vehicle is moving, coasting-time printing devices, clock controlled means for driving the same only when the vehicle is coasting, mechanism for taking impressions from said devices at the beginning and end of each trip; and means actuated by said mechanism, when operated at the beginning of the trip, to set the printing devices to zero, whereby the impression taken at the end of the trip will show the elapsed time of running and coasting.

11. In a time recorder for vehicles, the combination of running-time printing devices, coasting time printing devices, means for taking impressions from said devices, a member associated with the impression-taking means to actuate the same, movable in one direction at the beginning of a trip and in another direction at the end of the trip, and means actuated by said member when moved at the beginning of the trip, to set the printing devices at zero in advance of the impression taking operation.

12. In a time recorder for vehicles, the combination of running time printing devices for recording the total time the vehicle is running; electromagnetic controlling devices for said means, constructed to maintain said recording time printing devices in operation while the vehicle is traveling; a circuit for said electromagnetic controlling devices; coasting time recording devices; electromagnetic controlling means for the coasting time recording devices; and means operable when the vehicle begins to coast to cut the said controlling means into said circuit whereby to set the coasting time recording devices in operation.

13. In a time recorder for vehicles, the combination of a shaft, a clock-driven time-printing wheel on the shaft, a time-printing wheel loosely mounted on the shaft and connected with the first named wheel so as to be driven thereby, means for disconnecting the second named wheel from the first, a shaft having a manual actuating member, means actuated by the last named shaft for taking impressions from the time-printing wheels when the shaft is rotated in either direction, and mechanism, operating when the last named shaft is rotated in one direction, to set the time-printing wheels to zero before the impression taking means operates.

14. In a time recorder for vehicles, in combination, a driving means for said vehicle, running time printing devices, coasting time printing devices, electromagnetic controlling means for said running time devices, electromagnetic controlling means for said coasting time devices, means for supplying current from the driving means to the aforesaid electromagnetic means when the vehicle is coasting, means for supplying current from the line to the running time controlling means when the vehicle is traveling under power, and means for shunting the current around the coasting time controlling means when the brakes are applied.

In testimony whereof I affix my signature in the presence of two subscribing witnesses.

CLINTON E. LARRABEE.

Witnesses:
LAWRENCE F. GIBLIN,
CHARLES U. BRIGGS.

Corrections in Letters Patent No. 1,133,045.

It is hereby certified that in Letters Patent No. 1,133,045, granted March 23, 1915, upon the application of Clinton E. Larrabee, of Binghamton, New York, for an improvement in "Time-Recorders for Vehicles," errors appear in the printed specification requiring correction as follows: Page 8, line 6, after the word "either" insert the words *or neither;* same page, line 93, strike out the words from "to check the" to the end of the claim and insert the words *whereby said coasting time devices are thrown out of operation when the brakes are applied and thrown in operation when the brakes are released and the vehicle is coasting.;* and that the said Letters Patent should be read with these corrections therein that the same may conform to the record of the case in the Patent Office.

Signed and sealed this 27th day of April, A. D., 1915.

[SEAL.]

J. T. NEWTON,
*Acting Commissioner of Patents.*